(12) United States Patent
Kim

(10) Patent No.: US 8,178,232 B2
(45) Date of Patent: May 15, 2012

(54) BATTERY PACK

(75) Inventor: Heong-Sin Kim, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 469 days.

(21) Appl. No.: 12/403,301

(22) Filed: Mar. 12, 2009

(65) Prior Publication Data

US 2009/0258285 A1    Oct. 15, 2009

(30) Foreign Application Priority Data

Apr. 11, 2008  (KR) .................. 10-2008-0033819

(51) Int. Cl.
 H01M 6/42  (2006.01)
(52) U.S. Cl. ............ 429/149; 429/151; 429/97; 429/99; 429/7
(58) Field of Classification Search ............ 429/96–100, 429/149, 151, 156, 158, 160, 65, 163, 7, 429/178, 181, 175, 177

See application file for complete search history.

(56) References Cited

U.S. PATENT DOCUMENTS

| | | | |
|---|---|---|---|
| 6,440,601 B1 | 8/2002 | Aoi et al. | |
| 2003/0215702 A1 | 11/2003 | Tanjou et al. | |
| 2005/0208346 A1 | 9/2005 | Moon et al. | |
| 2006/0266542 A1* | 11/2006 | Yoon | 174/112 |
| 2009/0155631 A1* | 6/2009 | Baek et al. | 429/7 |

FOREIGN PATENT DOCUMENTS

| | | |
|---|---|---|
| CN | 1174500 C | 11/2004 |
| EP | 1 427 036 A1 | 6/2004 |
| EP | 1 717 882 A1 | 11/2006 |
| JP | 11-297366 | 10/1999 |
| JP | 2000-100402 | 4/2000 |
| JP | 2003-162987 | 6/2003 |
| JP | 2003-234096 | 8/2003 |
| JP | 2006-164558 | 6/2006 |
| JP | 2006-164579 | 6/2006 |
| JP | 2007-073204 | 3/2007 |
| KR | 1999-0082935 | 11/1999 |
| KR | 10-2005-0074198 | 7/2005 |
| KR | 10-2005-0074199 | 7/2005 |
| KR | 10-2005-0087632 | 8/2005 |
| KR | 10-2006-0027268 | 3/2006 |
| KR | 10-2006-0049430 | 5/2006 |

(Continued)

OTHER PUBLICATIONS

European Search Report dated Jul. 17, 2009, for corresponding European application 09156136.5, noting listed references in this IDS.

(Continued)

*Primary Examiner* — Raymond Alejandro
(74) *Attorney, Agent, or Firm* — Christie, Parker & Hale, LLP

(57) ABSTRACT

A battery pack includes a multi cell assembly having a plurality of bare cells, the multi cell assembly defining opposing planar surfaces. The battery pack also includes a protection circuit at one side of the multi cell assembly, a case surrounding a periphery of the multi cell assembly and the protection circuit and exposing the opposing planar surfaces of the multi cell assembly to an exterior of the multi cell assembly and reinforcing tape attached to the opposing planar surfaces.

19 Claims, 3 Drawing Sheets

FOREIGN PATENT DOCUMENTS

| | | |
|---|---|---|
| KR | 10-2006-0113802 | 11/2006 |
| KR | 10-2007-0033834 | 3/2007 |
| WO | WO 2006/062295 A1 | 6/2006 |
| WO | WO 2006/067918 A2 | 6/2006 |

OTHER PUBLICATIONS

KIPO Office action dated Nov. 30, 2009, for priority Korean application 10-2008-0033819, noting listed references in this IDS.

SIPO Office action dated Feb. 23, 2011, for corresponding Chinese Patent application 200910118758.4, with English translation, noting listed reference in this IDS, as well as U.S. Publication 2003/0215702, previously filed in an IDS dated Oct. 9, 2009.

SIPO Office action dated Sep. 1, 2011, for corresponding Chinese Patent application 200910118758.4, with English translation, 6 pages.

Japanese Office action dated Apr. 3, 2012, for corresponding Japanese Patent application 2009-007747, 3 pages.

Patent Abstracts of Japan, and English machine translation of Japanese Publication 2006-164579, listed above, 26 pages.

Patent Abstracts of Japan, and English machine translation of Japanese Publication 2007-073204, listed above, 20 pages.

\* cited by examiner

BATTERY PACK

CROSS-REFERENCE TO RELATED APPLICATION

This application claims priority to and the benefit of Korean Patent Application No. 10-2008-0033819, filed Apr. 11, 2008, the entire content of which is incorporated herein by reference.

BACKGROUND OF THE INVENTION

1. Field of the Invention

The present invention relates to a battery pack.

2. Description of the Related Art

Secondary batteries are rechargeable and can be used repeatedly, unlike disposable batteries which cannot be reused after complete discharge.

Such secondary batteries are widely used in handheld electronic devices such as personal digital assistants (PDAs), camcorders, cellular phones, notebook computers and MP3 players.

Particularly, lithium secondary batteries are widely used because they have a high operating voltage, a high energy density per unit weight and capacity, and because they can be compact.

Lithium secondary batteries may be manufactured in various shapes, for example, a cylindrical shape, a rectangular shape or a pouch shape.

Lithium secondary batteries typically include an outer casing and an electrode assembly sealed within the outer casing.

The electrode assembly is formed by sequentially stacking and winding a positive electrode plate, a separator and a negative electrode plate.

In the cylindrical- or rectangular-type secondary battery, the outer casing is sealed by a cap assembly.

In the pouch-type secondary battery, the outer casing is sealed at its edge.

The secondary battery formed as such is generally called a bare cell, and a secondary battery including one or more bare cells formed in a pack is called a battery pack.

A battery pack including a plurality of bare cells may be formed by attaching a frame case having only an outer frame to the plurality of bare cells connected to each other.

However, the battery pack described above is vulnerable to fracture or dislodging of the bare cells by external impact at a connection section between the bare cells.

Alternatively, the battery pack may be formed by inserting the plurality of bare cells connected to each other into rectangular-type upper and lower injection cases, and coupling these cases to each other.

As the plurality of bare cells are connected to each other, with narrow side surfaces of the bare cells being in contact, the entire wide side surface of the bare cells connected to each other becomes far broader.

Therefore, a wide surface of the injection case into which the plurality of bare cells are inserted becomes far broader. Hence, since a wide surface of the injection case is vulnerable to the external impact, forming a thin case through injection molding is difficult. Thus, the thickness of the battery pack may be greater than desired.

SUMMARY OF THE INVENTION

According to aspects of the present invention, a battery pack is provided that can be thinner and/or have relatively increased strength.

According to an embodiment of the present invention, the battery pack includes a multi cell assembly having a plurality of bare cells, the multi cell assembly defining opposing planar surfaces. The battery pack also includes a protection circuit at one side of the multi cell assembly, a case surrounding a periphery of the multi cell assembly and the protection circuit and exposing the opposing planar surfaces of the multi cell assembly to an exterior of the multi cell assembly and reinforcing tape attached to the opposing planar surfaces.

In another embodiment, the case defines a rectangular frame having an outer frame enclosing a periphery of the multi cell assembly. Further, each of the plurality of bare cells may further define a side surface, and each of the plurality of bare cells may contact each other at the side surface. As such, the reinforcing tape may comprise a first reinforcing tape covering the edge surface of each of the plurality of bare cells and a second reinforcing tape attached to each of the opposing planar surfaces of the multi cell assembly, wherein the first reinforcing tape and the second reinforcing tape may be integral or separate.

In certain embodiments, a thickness of the reinforcing tape is about the same or less than a thickness as the case. More specifically, a thickness of the reinforcing tape may be from about 0.15 to 0.25 mm. The reinforcing tape may comprise plastic tape, such as polyethylene terephthalate, among others.

In another embodiment, the protection circuit may comprise a protection circuit board including a first connector comprising a long connector and a short connector, and a first lead terminal and a second lead terminal electrically connecting the multi cell assembly to the protection circuit board. The battery pack may also further comprise a holder between the multi cell assembly and the protection circuit, the holder including a second connector coupled to the first connector.

Further, the protection circuit board may be generally rectangular defining a long edge and a short edge, wherein the long connector extends along a longitudinal axis of the protection circuit board, and wherein the short connector has a length less than a length of the long connector. The first connector may define a notch or a hole, and the second connector may be a protrusion. In various embodiments, the long connector defines a hole or a notch having a longitudinal axis extending along a longitudinal axis of the protection circuit board and, and the short connector is a notch on the long edge of the protection circuit board.

In another embodiment, the battery pack includes an insulator between the multi cell assembly and the holder. Further, the multi cell assembly may define a bottom surface distal from the protection circuit and a side surface adjacent the protection circuit. The insulator may comprise a top beam between the multi cell assembly and the holder, a side beam between the side surface of the multi cell assembly and the second lead terminal, and a bottom beam between the bottom surface of the multi cell assembly and the second lead terminal.

Additional aspects of the invention will be set forth in part in the description which follows.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1A:
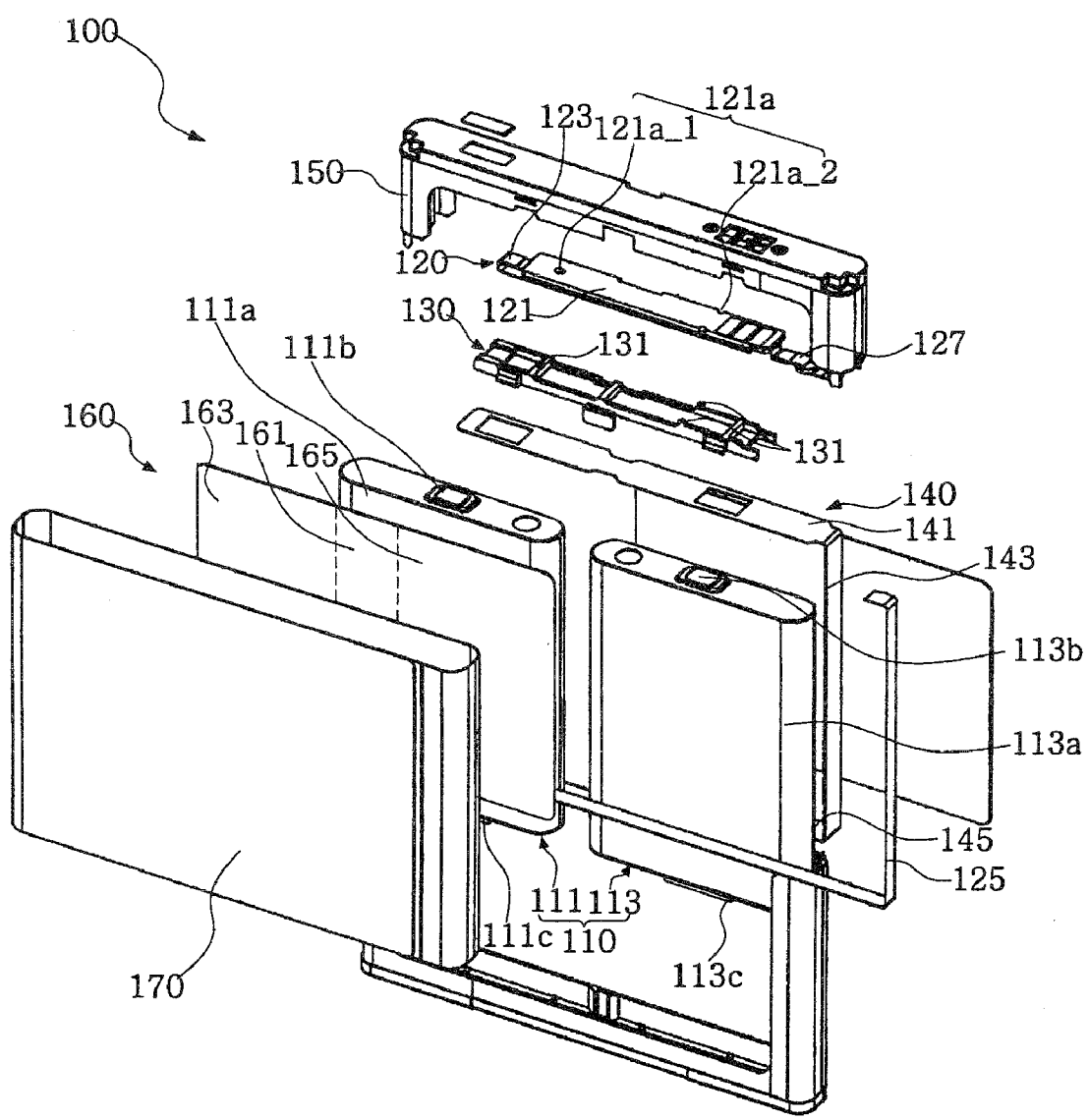
FIG. 1A is an exploded perspective view of a battery pack according to an embodiment of the present invention.

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 1B:
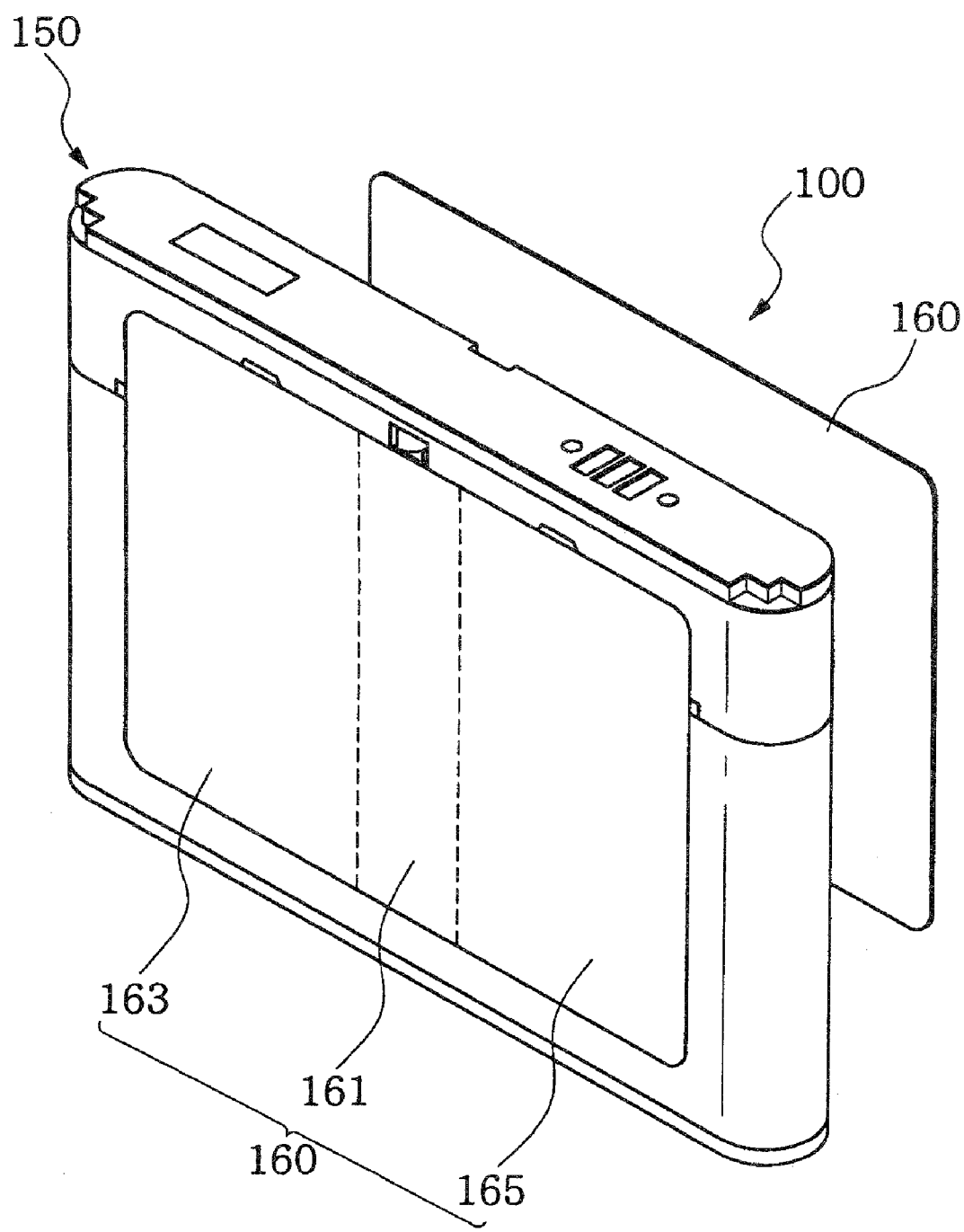
FIG. 1B is an assembled perspective view of the battery pack of FIG. 1A before tubing an outer casing.

FIG. 1A is an exploded perspective view of a battery pack according to an embodiment of the present invention, and FIG. 1B is an assembled perspective view of the battery pack of FIG. 1A before tubing an outer casing.

Referring to FIGS. 1A and 1B, a battery pack 100 includes a multi cell assembly 110 having a plurality of bare cells 111, 113 in contact with each other at one surface, a protection circuit assembly 120 disposed at one side of the multi cell assembly 110, and a holder 130 disposed between the multi cell assembly 110 and the protection circuit assembly 120.

The battery pack 100 also includes an insulator 140 disposed between the multi cell assembly 110 and the holder 130, and a case 150 surrounding the protection circuit assembly 120 and the multi cell assembly 110 connected to each other.

The battery pack 100 also includes reinforcing tape 160 attached to both wide side or planar surfaces of the multi cell assembly 110, and an outer casing 170 for tubing or labeling.

The bare cells 111, 113 each include cans 111a, 113a, respectively, each having an opening at one side, and cap assemblies coupled with the openings.

Each of the bare cells 111, 113 includes an electrode assembly and an electrolyte accommodated in each of the cans 111a, 113a, and the electrode assembly may be formed by stacking and then winding a positive electrode plate, a negative electrode plate and a separator.

The cans 111a, 113a may be formed in a prismatic shape or a prismatic shape having rounded corners.

Each of the bare cells 111, 113 includes opposing narrow side surfaces or edge surfaces and opposing wide side surfaces, the surfaces being connected with each other, and the bare cells 111, 113 being in contact with each other at the narrow side surfaces.

The bare cells 111, 113 include first electrode terminals 111b, 113b and second electrode terminals 111c, 113c, respectively.

Hereinafter, the first electrode terminals 111b, 113b are called negative electrode terminals, and the second electrode terminals 111c, 113c are called positive electrode terminals.

Depending on the process of forming the bare cells 111, 113, the cans 111a, 113a may serve as positive electrode terminals, or an electrode plate attached to one surface of each can 111a, 113a may serve as a positive electrode terminal.

In the present embodiment, the electrode plates serve as positive electrode terminals, and their polarities can be changed according to the process of forming an electrode terminal.

The first electrode terminals 111b, 113b and the second electrode terminals 111c, 113c may be formed in the same direction or orientation or opposite orientations.

Hereinafter, surfaces of the bare cells 111, 113 on which the negative electrode terminals 111b, 113b are formed are called top surfaces of the multi cell assembly 110, and surfaces of the bare cells on which the electrode plates 111c, 113c, the positive electrode terminals, are formed are called bottom surfaces of the multi cell assembly 110.

The electrode plates may be formed in a clad metal structure of two metal layers, and the electrode plates are attached to the cans 111a, 113a by ultrasonic welding, etc. In an embodiment of the present invention, one of the two metal layers is an aluminum layer and the other of the two metal layers is a nickel layer. The aluminum layers are attached to the cans 111a, 113a by ultrasonic welding, etc.

The negative electrode terminals 111b, 113b are connected with a first lead terminal 123, and nickel layers of the second electrode terminals 111c, 113c are connected with a second lead terminal 125.

Although the bare cell is formed in a rectangular shape in the present embodiment, the present invention is not limited thereto, and thus the bare cell may be formed in other shapes such as a pouch or cylindrical shape.

The protection circuit assembly 120 includes a protection circuit board 121 including a protection circuit and an external connection terminal mounted on a printed circuit board, a first lead terminal 123 and a second lead terminal 125.

The protection circuit board 121 includes a first connector 121a to couple with a second connector 131 of the holder 130.

The first connector 121a may be a groove, a notch, or a hole, and the second connector 131 may be a protrusion.

When the first connectors 121a include a plurality of elements or components, the first connector 121a may include a long connector 121a_1 having a longitudinal axis generally parallel to a longitudinal axis of the protection circuit board 121, and a short connector 121a_2 having a relatively shorter length than the long connector 121a_1.

Figure 2A:
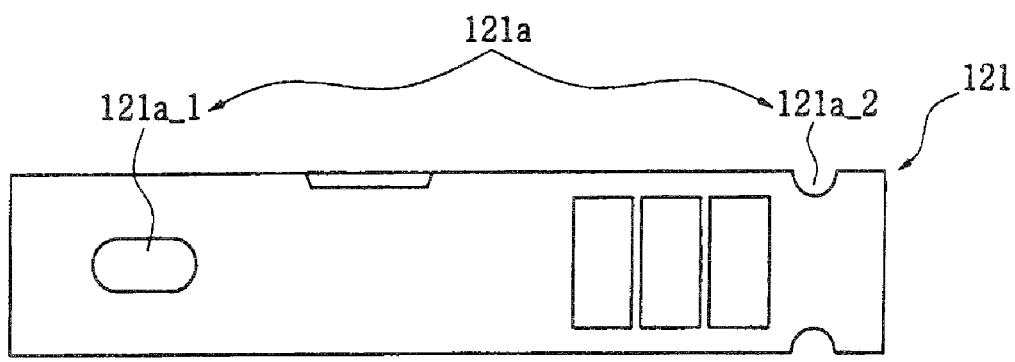
FIGS. 2A, 2B and 2C are plan views illustrating various protection circuit boards according to embodiments of the present invention.
Figure 2B:
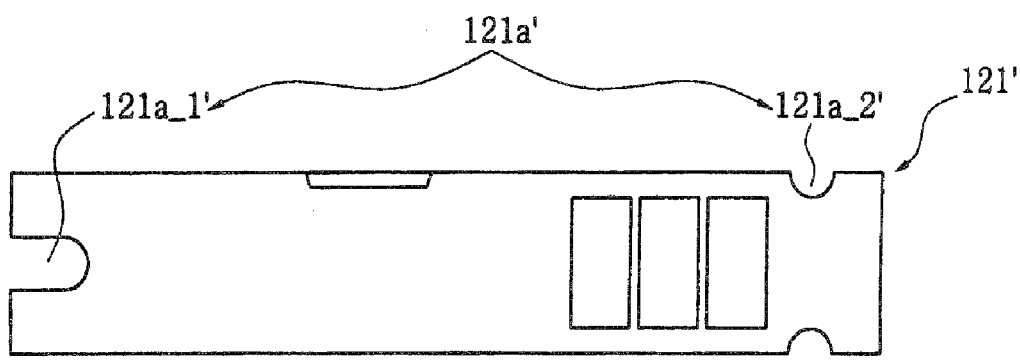
Figure 2C:
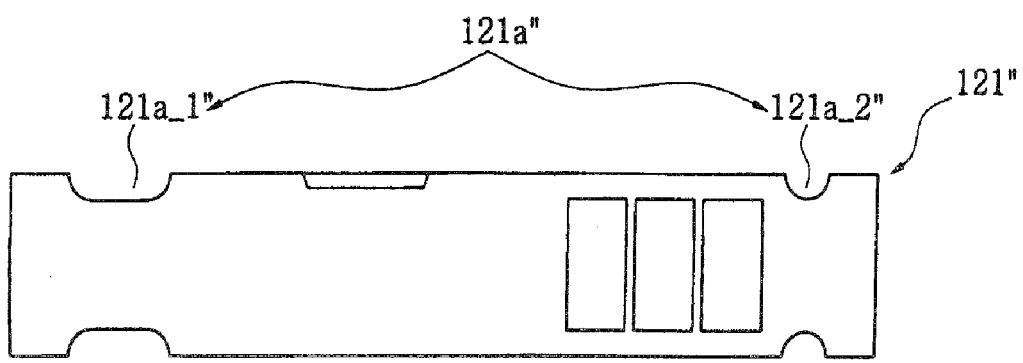

FIGS. 2A to 2C are plan views illustrating various shapes of embodiments of a protection circuit board 121, 121', 121" having a first connector.

As illustrated in FIG. 2A, the first connector 121a includes a hole 121a_1 (a long connector) having a longitudinal axis generally parallel to a longitudinal axis of the protection circuit board 121, and a first notch 121a_2 (a short connector), formed at a longitudinal edge of the protection circuit board.

While one hole 121a_1 and two first notches 121a_2 are located on the protection circuit board 121 in the present embodiment, the present invention is not limited thereto.

Further, as illustrated in FIG. 2B, the first connector 121a' includes a second notch 121a_1' (a long connector) formed at a lateral edge of the protection circuit board 121' and extending longitudinally toward a center of the protection circuit board, and a third notch 121a_2' (a short connector) formed along a longitudinal edge of the protection circuit board. While one second notch 121a_1' and two third notches 121a_2" are illustrated, the present invention is not limited to the specific number or configuration of the notches as shown in FIG. 2B.

Alternatively, as illustrated in FIG. 2C, the first connector 121a" includes a fourth notch 121a_1" (a long connector) formed at a longitudinal edge of the protection circuit board 121", and a fifth notch 121a_2" (a short connector) formed at a longitudinal edge of the protection circuit board. While two fourth notches 121a_1" and two fifth notches 121a_2" are illustrated, the present invention is not limited to the specific number or configuration of the notches as shown in FIG. 2C.

The shape and location of the first connectors 121a, 121a' and 121a" are not limited to the present embodiment, and the first connector may be formed in various ways and in various configurations to couple with a second connector 131 of a holder 130.

Accordingly, the first connectors 121a, 121a' and 121a" includes a long connectors 121a_1, 121a_1' and 121a_1", so that machining errors may be prevented or significantly reduced.

The first lead terminal 123 and the second lead terminal 125 electrically connect the multi cell assembly 110 to the protection circuit board 121.

That is, the first lead terminal 123 is connected with the protection circuit board 121 at one side, and connected with the negative electrode terminals 111b, 113b at the other side.

Further, the second lead terminal 125 is connected with the protection circuit board 121 at one side, and connected with the second electrode terminals 111c, 113c at the other side.

The protection circuit causes an inner circuit to short-circuit to stop current flowing thereto, and thus prevents combustion or explosion of the battery when abnormal operations such as overcharge, overdischarge and overheating occur.

Also, the protection circuit assembly 120 further includes a positive temperature coefficient (PTC) thermistor 127 disposed between the protection circuit board 121 and the second lead terminal 125.

The holder 130 may be disposed between the multi cell assembly 110 and the protection circuit board 121, may have a shape capable of coupling to the protection circuit board 121, and may be formed of plastic.

The holder 130 may also include a second connector 131 formed to couple with the first connector 121a of the protection circuit board 121.

The second connector 131 may be formed at any location of the holder 130 to correspond to or be aligned with the first connector 121a.

In the present embodiment, the first connector 121a may be a notch or a hole, and the second connector 131 may be a protrusion.

The insulator 140 may include a top beam 141, a side beam 143 and a bottom beam 145.

The top beam 141 is disposed between a top surface of the multi cell assembly 110 and the holder 130 to improve cohesive strength between the multi cell assembly 110 and the holder 130.

The side beam 143 is disposed between a side surface of the multi cell assembly 110 and the second lead terminal 125, and the bottom beam 145 is disposed between the bottom surface of the multi cell assembly 110 and the second lead terminal 125.

The side beam 143 and the bottom beam 145 improve cohesive strength between the multi cell assembly 110 and the second lead terminal 125.

The case 150 may be formed in a square or rectangular frame having only an outer frame to surround narrow side surfaces, a top surface and a bottom surface of the multi cell assembly 110, and the protection circuit assembly 120.

The case 150 may be formed as a single component, or may be separated into two parts, e.g., an upper case and a lower case, coupled together as illustrated in the present embodiment.

Thus, the case 150 exposes both planar surfaces of the multi cell assembly 110 to an exterior of the multi cell assembly.

The case 150 may be formed by injection molding a polyamide, polyurethane, plastic, fiber reinforced plastic, engineering plastic, hot melt resin or an equivalent thereof.

Reinforcing tape 160 is attached to each wide side or planar surface of the multi cell assembly 110 exposed to the exterior, and serves to increase strength and reinforce the planar surface.

The reinforcing tape 160 may be a thin plastic tape formed by extrusion molding, and may be formed of polyethylene terephthalate (PET) or an equivalent thereof, but the present invention is not limited thereto.

A thickness of the reinforcing tape 160 may be the same as or thinner than that of the case 150.

If the reinforcing tape 160 is too thick, a total thickness of the battery pack is increased, and when the reinforcing tape 160 is too thin, it may not function suitably. In one embodiment, the thickness of the reinforcing tape 160 may be from about 0.15 to 0.25 mm.

The reinforcing tape 160 includes a first reinforcing tape 161 covering a contact part between the bare cells 111, 113.

Thus, the first reinforcing tape 161 may prevent dislocation or easy detachment of the contact part between the bare cells 111, 113 from each other due to external impact.

The reinforcing tape 160 may also includes second reinforcing tapes 163, 165 disposed at respective planar sides of the bare cells 111, 113.

Thus, the second reinforcing tapes can protect weak planar surfaces, and improve the strength of the planar surfaces to prevent damage to the planar surfaces of the bare cells due to external impact.

The first reinforcing tape 161 and the second reinforcing tapes 163, 165 may be formed as a single integral component or may be separate from one another.

The outer casing 170 may be a tape-type label attached to cover the side surface of the multi cell assembly 110 or a heat shrinkable tube.

Consequently, a reinforcing tape is included on a planar surface of a multi cell assembly to improve strength. Due to the improved strength, a battery pack may have a thinner case, and thus an overall thickness of the battery pack may be reduced.

Although embodiments of the present invention have been shown and described, it would be appreciated by those skilled in the art that changes may be made to the embodiments without departing from the principles and spirit of the invention, the scope of which is defined in the claims and their equivalents.

What is claimed is:

1. A battery pack, comprising:
a multi cell assembly comprising a plurality of bare cells, the multi cell assembly defining opposing planar surfaces;
a protection circuit at one side of the multi cell assembly, wherein the protection circuit comprises a protection circuit board including a first connector comprising a long connector being an opening in the protection circuit board and a short connector being a notch on an edge of the protection circuit board, and a first lead terminal and a second lead terminal electrically connecting the multi cell assembly to the protection circuit board;
a holder between the multi cell assembly and the protection circuit, the holder including a second connector comprising a protrusion coupled to the first connector;
a case surrounding a periphery of the multi cell assembly and the protection circuit and exposing the opposing planar surfaces of the multi cell assembly to an exterior of the multi cell assembly; and
reinforcing tape attached to the opposing planar surfaces.

2. The battery pack according to claim 1, wherein the case defines a rectangular frame having an outer frame surrounding the periphery of the multi cell assembly.

3. The battery pack according to claim 1, wherein each of the plurality of bare cells further define a side surface, and wherein each of the plurality of bare cells contact each other at the side surface.

4. The battery pack according to claim 3, wherein the reinforcing tape comprises first reinforcing tapes covering the edge surface of each of the plurality of bare cells.

5. The battery pack according to claim 4, wherein the reinforcing tape includes second reinforcing tapes attached to each of the opposing planar surfaces of the multi cell assembly.

6. The battery pack according to claim 5, wherein the first reinforcing tapes and the second reinforcing tapes are integral.

7. The battery pack according to claim 5, wherein the first reinforcing tapes and the second reinforcing tapes are separate.

8. The battery pack according to claim 1, wherein a thickness of the reinforcing tape is about the same as a thickness as the case.

9. The battery pack according to claim 1, wherein a thickness of the reinforcing tape is less than a thickness as the case.

10. The battery pack according to claim 1, wherein a thickness of the reinforcing tape is from about 0.15 to 0.25 mm.

11. The battery pack according to claim 1, wherein the reinforcing tape comprises plastic tape.

12. The battery pack according to claim 1, wherein the reinforcing tape comprises polyethylene terephthalate.

13. The battery pack according to claim 1, wherein the protection circuit board is generally rectangular defining a long edge and a short edge, wherein the long connector extends along a longitudinal axis of the protection circuit board, and wherein the short connector has a length less than a length of the long connector.

14. The battery pack according to claim 13, wherein the long connector has a longitudinal axis extending along a longitudinal axis of the protection circuit board, and wherein the short connector is on the long edge of the protection circuit board.

15. The battery pack according to claim 13, wherein the long connector is a notch on the short edge of the protection circuit board, and the short connector is a notch on the long edge of the protection circuit board.

16. The battery pack according to claim 13, wherein the long connector is a notch on the long edge of the protection circuit board, and the short connector is a notch on the long edge of the protection circuit board.

17. The battery pack according to claim 1, further comprising:
    an insulator between the multi cell assembly and the holder.

18. The battery pack according to claim 17, wherein the multi cell assembly defines a bottom surface distal from the protection circuit and a side surface adjacent the protection circuit, and wherein the insulator comprises a top beam between the multi cell assembly and the holder, a side beam between the side surface of the multi cell assembly and the second lead terminal, and a bottom beam between the bottom surface of the multi cell assembly and the second lead terminal.

19. The battery pack according to claim 1, wherein each of the plurality of bare cells includes a positive electrode terminal and a negative electrode terminal,
    wherein the first lead terminal is connected with the negative electrode terminal and the second lead terminal is connected with the positive electrode terminal, and
    wherein the protection circuit further includes a positive temperature coefficient thermistor between the protection circuit board and the second lead terminal.

* * * * *